(12) United States Patent
Kahn

(10) Patent No.: US 6,690,778 B2
(45) Date of Patent: Feb. 10, 2004

(54) METHOD AND APPARATUS FOR AUTOMATICALLY ADJUSTING AN ELECTRONIC DEVICE OUTPUT IN RESPONSE TO AN INCOMING TELEPHONE CALL

(75) Inventor: Michael Kahn, Westampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

(21) Appl. No.: 10/050,353

(22) Filed: Jan. 16, 2002

(65) Prior Publication Data

US 2003/0133551 A1 Jul. 17, 2003

(51) Int. Cl.[7] .............................................. H04M 11/00
(52) U.S. Cl. ............................. 379/110.01; 379/102.02; 379/102.03
(58) Field of Search ....................... 379/102.01–102.04, 379/110.01, 90.01

(56) References Cited

U.S. PATENT DOCUMENTS

| | | | |
|---|---|---|---|
| 5,128,987 A | * | 7/1992 | McDonough et al. .. 379/102.03 |
| 5,987,106 A | | 11/1999 | Kitamura |
| 5,999,207 A | | 12/1999 | Rodriguez et al. |

FOREIGN PATENT DOCUMENTS

| | | | | | |
|---|---|---|---|---|---|
| JP | 01078059 A | * | 3/1989 | ............ | H04M/1/00 |
| JP | 05175769 A | * | 7/1993 | ............ | H03G/3/30 |

* cited by examiner

Primary Examiner—Wing Fu Chan
(74) Attorney, Agent, or Firm—RatnerPrestia

(57) ABSTRACT

An electronic device automatically adjusts an output signal emanating from an output of the device. The device includes a telephony interface for receiving a telephony transmission. The device detects a ring signal from the telephony transmission, and automatically adjusts the output signal of the device. The adjusted output signal can be used to notify an operator of a detected ring signal or to attenuate the output signal of the device to allow for ease of hearing the telephone transmission. In one embodiment, the device can automatically restore the output signal following completion of the telephone transmission or an action by a user of the electronic device.

10 Claims, 5 Drawing Sheets

METHOD AND APPARATUS FOR AUTOMATICALLY ADJUSTING AN ELECTRONIC DEVICE OUTPUT IN RESPONSE TO AN INCOMING TELEPHONE CALL

BACKGROUND OF THE INVENTION

The present invention relates to electronic devices which produce an audio and/or video output signal, and more particularly to electronic devices including an operably linked telephony interface for identifying the presence of an incoming telephone call during use of the electronic device and automatically adjusting the output signal of the device based on the incoming call status of the telephony interface.

Modern society utilizes an ever increasing number of electronic devices in entertainment and general household applications. Most electronic entertainment devices are utilized to provide audio and/or video signals, these signals may be in the form of a television broadcast, a reproduced digital versatile disk (DVD) recording, a video game signal, a compact disk (CD) recording, an MP3 recording, or the like. While using such devices, an operator may become distracted by the audio/video output of these devices. Similarly, individuals, particularly the elderly or hearing impaired may not have the ability to discern other local sounds of interest, such as a telephone ring or transmission, when using such devices.

As can be appreciated, individuals rely on their sense of hearing to detect sounds external to the audio/video signals of entertainment devices. For example, when an individual is able to detect a telephone ring signal, the individual typically adjusts the sound levels on the entertainment devices in use in order to conduct a telephone conversation. Any delay in adjusting these outputs may cause the individual to miss the phone call, especially when the detection of the ring signal is not immediate. Moreover, an individual may not be able to detect a telephone ring signal while entertainment devices are in use, causing the individual to miss the phone call.

Presently, a telephone ring signal detection system is desired in which an individual can be immediately notified of an incoming telephone call without disrupting the delivery of audio/video signals. Further, a system is desired in which audio levels of electronic devices in use can be altered for the duration of the call, and/or video messages can be presented by the electronic device to provide notification of an incoming call.

SUMMARY OF THE INVENTION

An electronic audio or audio-visual device is provided having at least an audio output for emanating a desired output signal including an active audio signal. A telephony interface is connected to a telephony network configured for carrying telephony transmissions. A control system is configured to detect a ring signal from the telephony interface. Upon detection of a ring signal from the telephony interface, the control system is further configured to provide an adjusted output signal. The adjusted output signal may comprise at least one of an audio or video alert to notify one or more individuals of an incoming call. The at least one of an audio or video alert can be provided in addition to or in place of the unadjusted or desired output signal. Alternatively, the adjusted output signal can be the desired output signal with an attenuated amplitude or volume level, provided in place of the desired output signal. The control system can be incorporated within a receiver, such as an integrated television receiver/decoder, a set-top box, or a stereo receiver. Alternatively, the control system can be incorporated in an external control device that provides a control signal which corresponds to a volume adjustment signal from a remote control device for the electronic device being controlled.

In another aspect of the invention, the device detects when conditions exist for restoring the output signal to an unaltered state. For example, the device may be configured to detect a disconnect signal at the telephony interface, and restore the output signal following detection. Alternatively, the device may prompt a user to provide an input such as touching a button on a remote device to restore the unaltered output signal.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
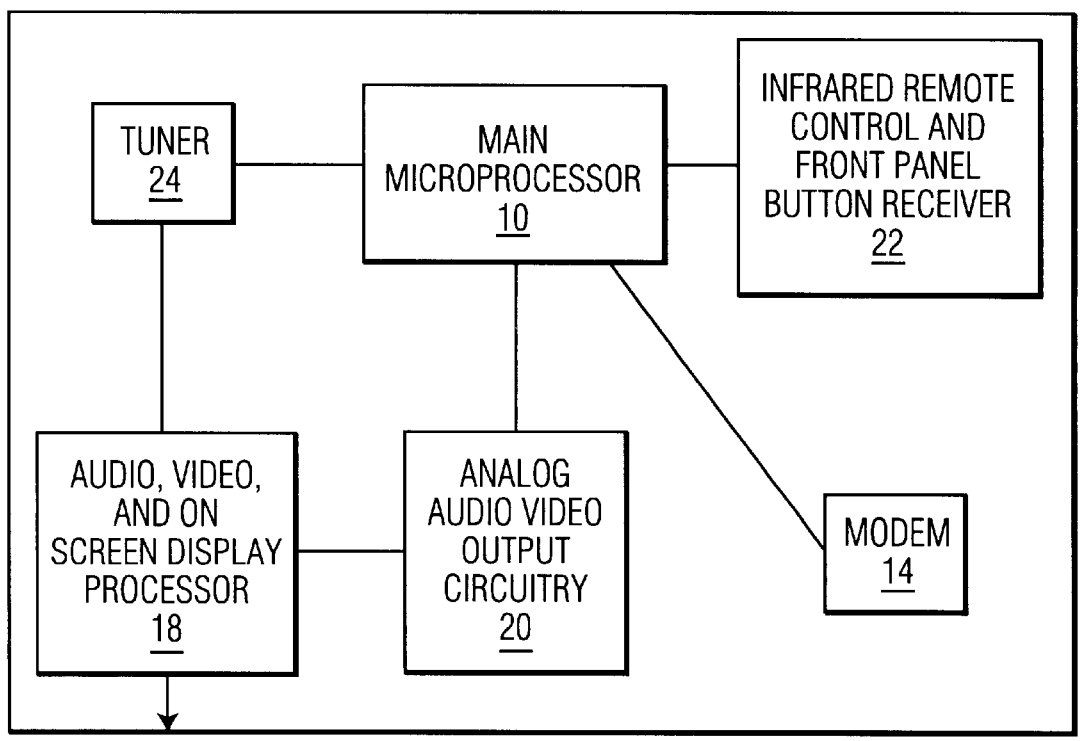
FIG. 1 is a block diagram of a digital television system that includes an embodiment of the present invention.

Certain terminology used in the following description is for convenience only and is not limiting. The term "electronic device" as used herein refers to any electronic device, which is capable of providing an audio and or video signal to an operator in the form of sound or images. The term "telephony interface" is defined as referring to any number of interfaces, such as PSTN or ISDN which enables voice communication between remote parties. In the drawings, the same reference numerals are used for designating the same elements throughout the several figures.

The present invention provides the capability of automatically adjusting the output signal of an electronic device based on an incoming call status at a telephony interface. The incoming call status may be determined using one of a variety of conventional methods. Telephony networks typically transmit a ring signal to indicate an incoming call. Typical modems provide for ring detection by sending an interrupt signal or by setting a port or register to a data value pre-selected to indicate a ring signal when a ring signal is transmitted. For example, on the Silicon Laboratories Si2400 modem, an ASCII "R" is read from the modem when an incoming "Ring" signal is detected.

A Digital Television System which includes an embodiment of the present invention is shown in FIG. 1. The system is controlled by a program executing on main microprocessor 10. The processor 10 may include a read only memory (ROM) encoded with program data, as well as a small random access memory (RAM) for operating data values. Signals from terrestrial, cable, or satellite broadcast are received via tuner 24. Signals from a user interface are received via infrared remote control and front panel button receiver 22. Audio & Video data from tuner 24 is sent to the Audio, Video and On Screen Display processor 18. The processor 18 decodes the received audio and video data to provide digital audio and video output signals. The Audio and Video output signals may be provided to an output port as digital signals, or converted to the analog domain via Digital to Analog conversion in the Analog Audio Video Output Circuitry 20. The circuitry 20 may include, for example, a digital to analog converter (not shown), audio or video amplifiers (not shown), and tone, volume, color saturation, color hue, brightness, and contrast controls (not shown). Modem 14 is connected to a telephony network, available at the location of the digital television system.

In the digital television system of FIG. 1, a program executing on microprocessor 10 receives user input from remote control and front panel receiver 22. The software then controls tuner 24 to select a desired frequency. The data signal transmitted at the selected frequency is then demodulated and sent to A/V processor 18, where, once decoded, it may be output digitally, or converted to an analog signal via analog output circuitry 20. Microprocessor 10 also controls the amplitude of the audio output signal emanating from analog audio video output 20 and can provide an on screen video signal over, or in place of, the video signal from tuner 24. In order to communicate with a service provider, the digital television system shown in FIG. 1 periodically makes outgoing calls via an integral telephony interface, modem 14. The modem 14 may be used, for example, to monitor the use of premium services or to order pay-per-view presentation.

Although the present invention is described in terms of a television receiver, it should be noted that the present invention could be implemented in an electronic device other than a television system. It should be further noted that an electrical device which does not include an integrated modem could be provided with a telephony interface that provides an indication of a ring signal from a telephony network to which the telephony interface is connected.

Figure 2:
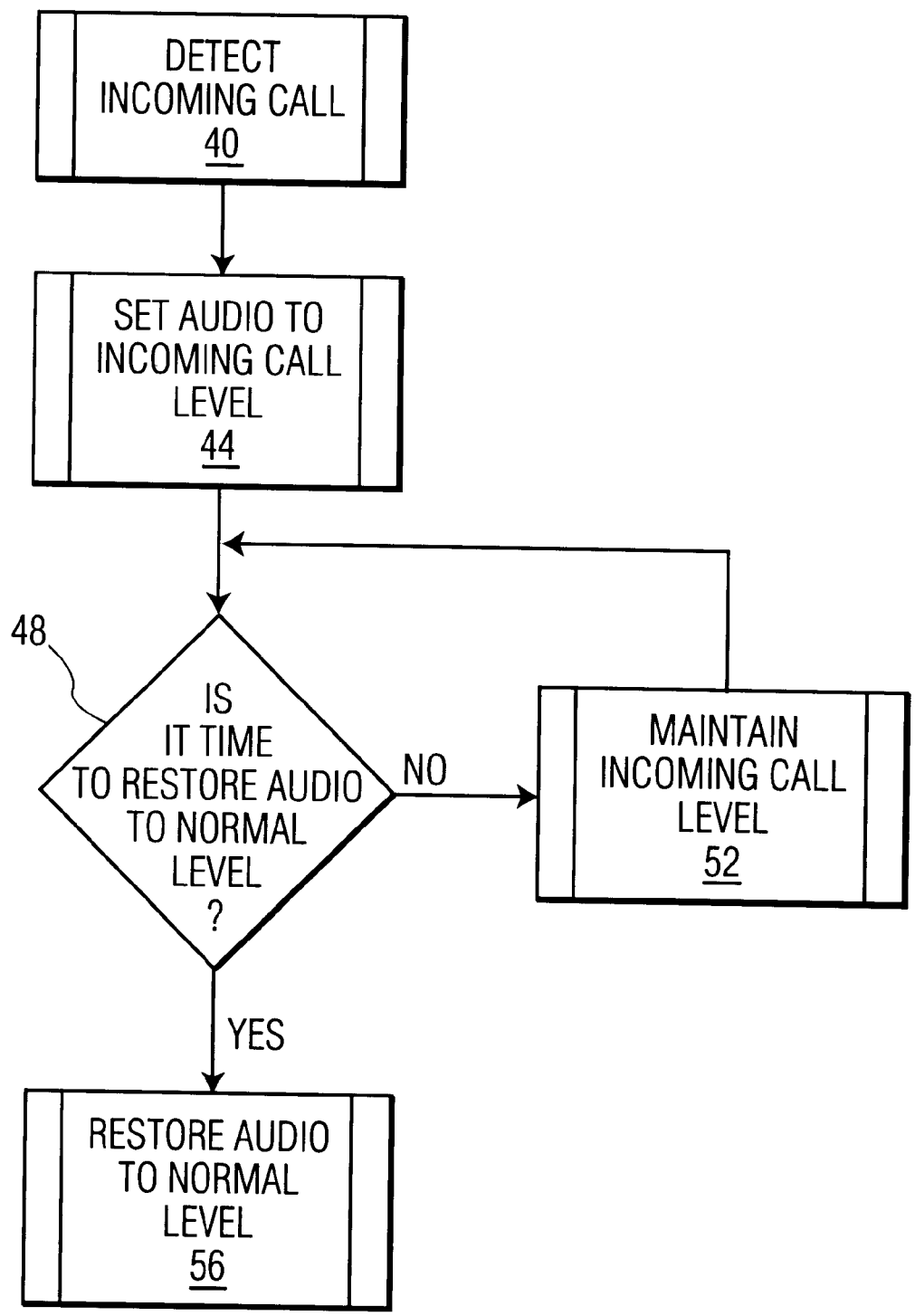
FIG. 2 is a process flow for a program to automatically adjust the output signal from an electronic device according to one embodiment of the present invention.

In one embodiment of the present invention, the program executing on microprocessor 10 is programmed to detect an incoming call and attenuate the audio output signal emanating from analog audio video output circuitry 20 to an amplitude corresponding to a volume level setting selected for use during incoming calls. Referring to FIG. 2, an incoming call is detected (step 40). The incoming call can be detected, for example, as an interrupt signal at the telephony interface, modem 14, or as a ring signal data value detected during periodic polling of register values for the telephony interface, modem 14.

In the exemplary embodiment of the present invention, the amplitude of an audio signal is attenuated. After detecting an incoming call, the program executing on microprocessor 10 is programmed to set the amplitude of the audio output signal emanating from analog audio video output circuitry 20 to a volume level appropriate for use during incoming calls (step 44). Preferably, a program executing on microprocessor 10 adjusts an existing volume level control parameter. This can be accomplished by: (a) adjusting a volume level setting in the digital domain by controlling A/V processor 18, or (b) adjusting the volume level in the analog domain by controlling analog output circuitry 20. Either of these methods can be incorporated into a program executing on microprocessor 10. In the simplest case, the volume adjustment can be a transition from the current user selected volume level (i.e., the desired volume level) for normal listening to zero level (muted) where the sound can no longer be heard. In an alternate embodiment, the volume can be set to a level specified in advance by a user upon detection of the incoming call. The incoming call level can be specified as a particular setting (e.g., a volume level setting of 12 on an audio volume scale ranging from 0 to 63 with 63 being the loudest volume). Alternatively, the incoming call level can be specified using an algorithm incorporating the current volume setting (e.g., a reduction factor of 25% which would cause a volume signal set at 20 to be reduced by 25% of its value to a setting of 15). It may be desirable to adjust the volume to a non-zero level (i.e., a level other than "mute") when there are multiple people in the room watching television. When the incoming call arrives, one viewer may answer the telephone, while the other viewers can continue to watch the program at a reduced volume.

In the case of digital domain control, attenuation registers on A/V processor 18 (shown in FIG. 1) control the output volume level. These registers can be programmed by a program executing on microprocessor 10. In the case of analog domain control, where the audio signal is simply muted, analog output circuitry 20 may contain an analog switch, controlled via a signal line from microprocessor 10. Where control is implemented using an adjustable volume level, analog output circuitry 20 would include an analog attenuation circuit. Digital domain control may be capable of implementation using existing hardware, thereby providing the advantage of not needing additional hardware to adjust the audio output signal.

In one embodiment, as shown in FIG. 2, a program executing on microprocessor 10 can perform the further steps of determining whether conditions for restoring desired output signal are present (step 48) and, when the conditions are present, restoring the desired output signal (step 56). The process may repeatedly test the telephone connection, maintaining the incoming call level (step 52) until the call is disconnected. The software can be configured to determine whether conditions for restoring the desired output signal are present using a manual method, an automatic method, or an automatic method with a manual override. In the manual method, the desired output signal is restored after user interaction. A manual method can comprise, for example, displaying an on-screen video message via the A/V processor saying "Incoming call. Press any key on remote to restore volume". In this case, the user could then press a key on the remote control to restore the desired output signal after the incoming call is completed, or press a key on the remote to restore the desired output signal before the incoming call is completed (e.g., the desired output signal could be restored while the incoming call is taken in another room). As shown in FIG. 2, step 48 is a logical decision step. In the manual method, when the software detects a key press via receiver 22, it processes the "yes" condition of step 48.

In the automatic method, modem 14, detects the "on hook" condition (intrusion completion), and reports this condition to the microprocessor 10. This may be reported via an interrupt signal from modem 14 to microprocessor 10 or a data value received from a port or register on the modem 14 that is periodically polled by microprocessor 10. For example, on the Silicon Laboratories Si2400 modem, an ASCII "I" is read from the modem when an intrusion is completed (phone is back on hook). Upon detecting the intrusion completion, the microprocessor 10, restores the normal volume via A/V processor 18, and/or analog output 20 (depending on implementation).

In one embodiment of the present invention, an alert signal is provided by, for example, adjusting or modifying a video signal, either in addition to or in place of, an adjustment of an audio output signal. For example, a video signal of a digital television can be altered to provide a visible alert of an incoming call. An "on-screen" message can be displayed when the incoming call is detected. In this case, upon receiving the incoming call notification from modem 14, the microprocessor 10, can display text via A/V processor 18, to indicate that a call is incoming. An example text may read "Incoming call detected". Alternatively, the video signal may be adjusted, for example, by periodically dimming or brightening the displayed image to indicate the occurrence of the ring signal. As can be appreciated, an alert signal may also be provided as an audible sound signal indicating the occurrence of a ring signal or by adjusting the volume level of an audio output signal to coincide with a ring signal only.

User Interface

Figure 3:
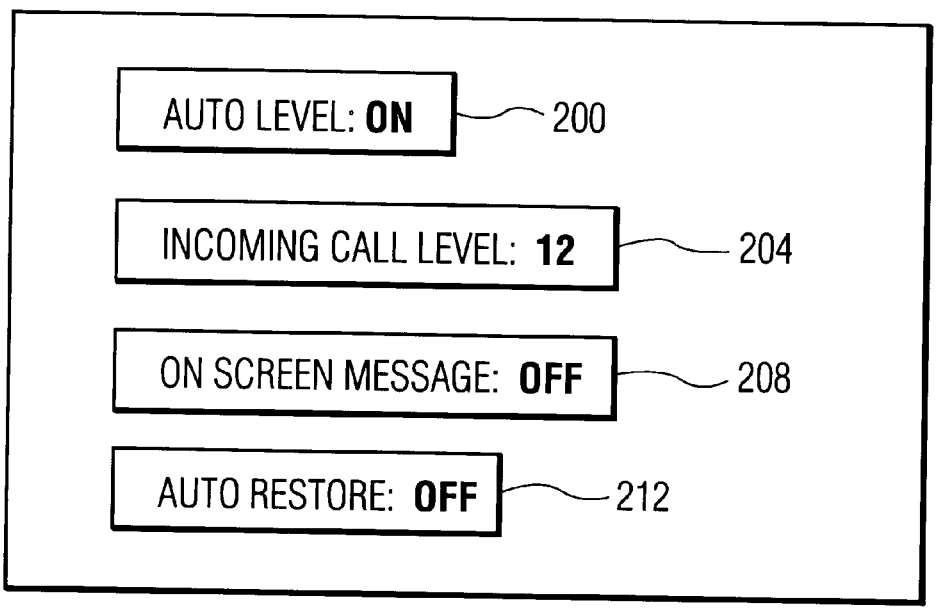
FIG. 3 is an exemplary interface screen for setting options for a system to automatically adjust the output signal from an electronic device according to one embodiment of the present invention.

For electronic devices with audio and video output signals, such as a digital television, the present invention can further include a user interface screen for entering system parameters according to user preferences. FIG. 3 shows an exemplary embodiment of a user interface screen that can be implemented to allow the user to establish the system behavior when an incoming call occurs. The user interface screen in FIG. 3 shows the system options (i.e., parameters) that the user may select. In the example shown in FIG. 3, the user can select to turn the automatic audio adjustment feature (labeled AUTO LEVEL 200) on or off. The volume level corresponding to the desired adjusted audio signal amplitude (labeled INCOMING CALL LEVEL 204) is automatically provided following detection of an incoming call. INCOMING CALL LEVEL 204 can be set to a specific numeric volume setting. An optional "on-screen" incoming alert message (labeled ON SCREEN MESSAGE 208) can be turned on or off. Automatic restoration of the audio output signal to its level prior to detection of the incoming call (labeled AUTO RESTORE 212) can be turned on or off. The user may "navigate" among the options and select the desired settings using an input device appropriate for the electronic device being controlled. For example, options can be selected for a digital television via a remote control device (not shown), signals from which are received by receiver 22, and processed by microprocessor 10.

In FIG. 3 a user has selected desired option settings (i.e., user preference settings) for a digital television according to the present invention, and the system has saved the selected values to various registers (not shown) or memory locations of the main processor 10 corresponding to the available options. The user selection for AUTO LEVEL 200 shown in FIG. 3 is "ON". When set to "ON" (as shown in the figure) the system performs the automatic audio level adjustments in accordance with the user-established preferences. When set to "OFF" (not shown), the system does not make any audio adjustments based on the incoming call, and the parameters stored in 204 and 212 are not used.

Referring again to FIG. 3, INCOMING CALL LEVEL 204 is set to a numerical volume setting of 12. When Auto Level 200 is set to "ON", and INCOMING CALL LEVEL 204 is set to 12, the system adjusts an audio output signal amplitude to correspond to a numerical volume level setting of 12 (typically on a range of 0 to 63) upon detection of an incoming call. It should be noted that a volume setting of 12 is exemplary, and any volume setting from 0 to 63 can be selected for adjustment during incoming calls. Preferably, the user selects a volume setting that allows a telephone audio output signal to be easily heard over the adjusted audio output signal of the electronic device. It should be further noted that if AUTO LEVEL 200 is set to "OFF" the amplitude of the audio output signal remains unadjusted upon detection of an incoming call.

Still referring to FIG. 3 ON SCREEN MESSAGE 208 can be set to "OFF" as shown or "ON" (not shown). When ON SCREEN MESSAGE 208 is set to "ON" (not shown), the system displays a text message on the screen alerting a viewer to an incoming call. When the ON SCREEN MESSAGE is set to "OFF" (as shown), no message is displayed.

Still referring to FIG. 3, AUTO RESTORE 212 can be set to "OFF" as shown or "ON" (not shown. When AUTO LEVEL 200 is set to "ON" and AUTO RESTORE 212 is set to ON (not shown), the system automatically brings the volume to its restored level when the telephone call completes. When AUTO RESTORE 212 is set to OFF (as shown), the normal volume level is not restored until a user specified action (for example: a key press on the remote control device) occurs.

Figure 4:
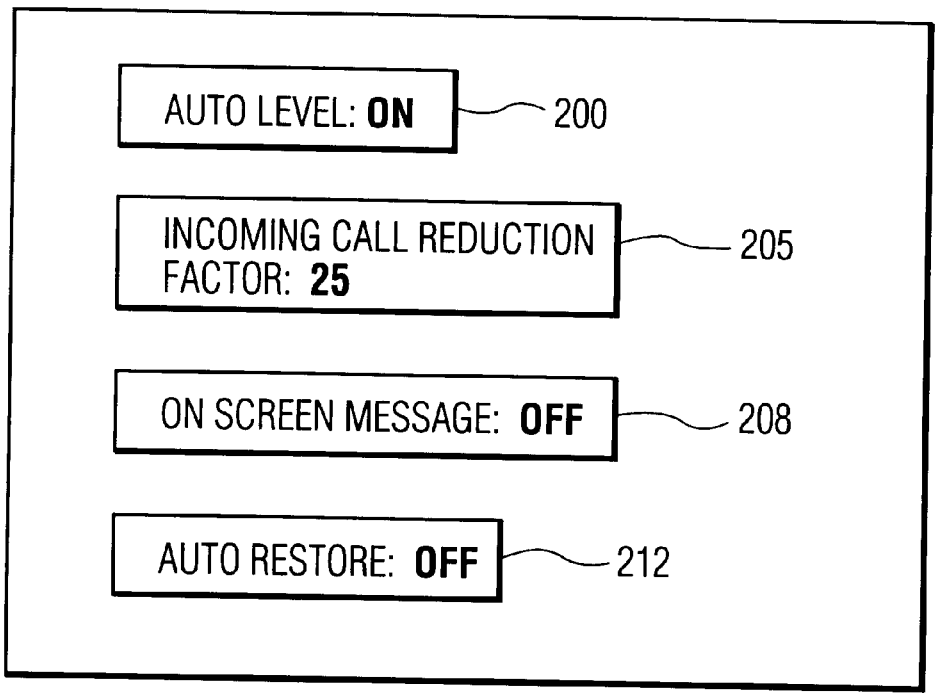
FIG. 4 is an exemplary interface screen for setting options for a system to automatically adjust the output signal from an electronic device according to an alternate embodiment of the present invention.

An alternate embodiment of the user interface is shown in FIG. 4. It is similar to FIG. 3, except that INCOMING CALL LEVEL (204 in FIG. 3), has been replaced by INCOMING CALL REDUCTION FACTOR 205. This option operates to reduce the amplitude of an audio output signal by a set factor or percentage. For example, in FIG. 4, the INCOMING CALL REDUCTION FACTOR is set to 25. When the system detects an incoming call, it reduces the amplitude of the audio output signal by 25% allowing an individual answering the telephone call to hear the audio signal from the telephone over the audio output signal from the electronic device.

Enhanced Algorithm

Figure 5:
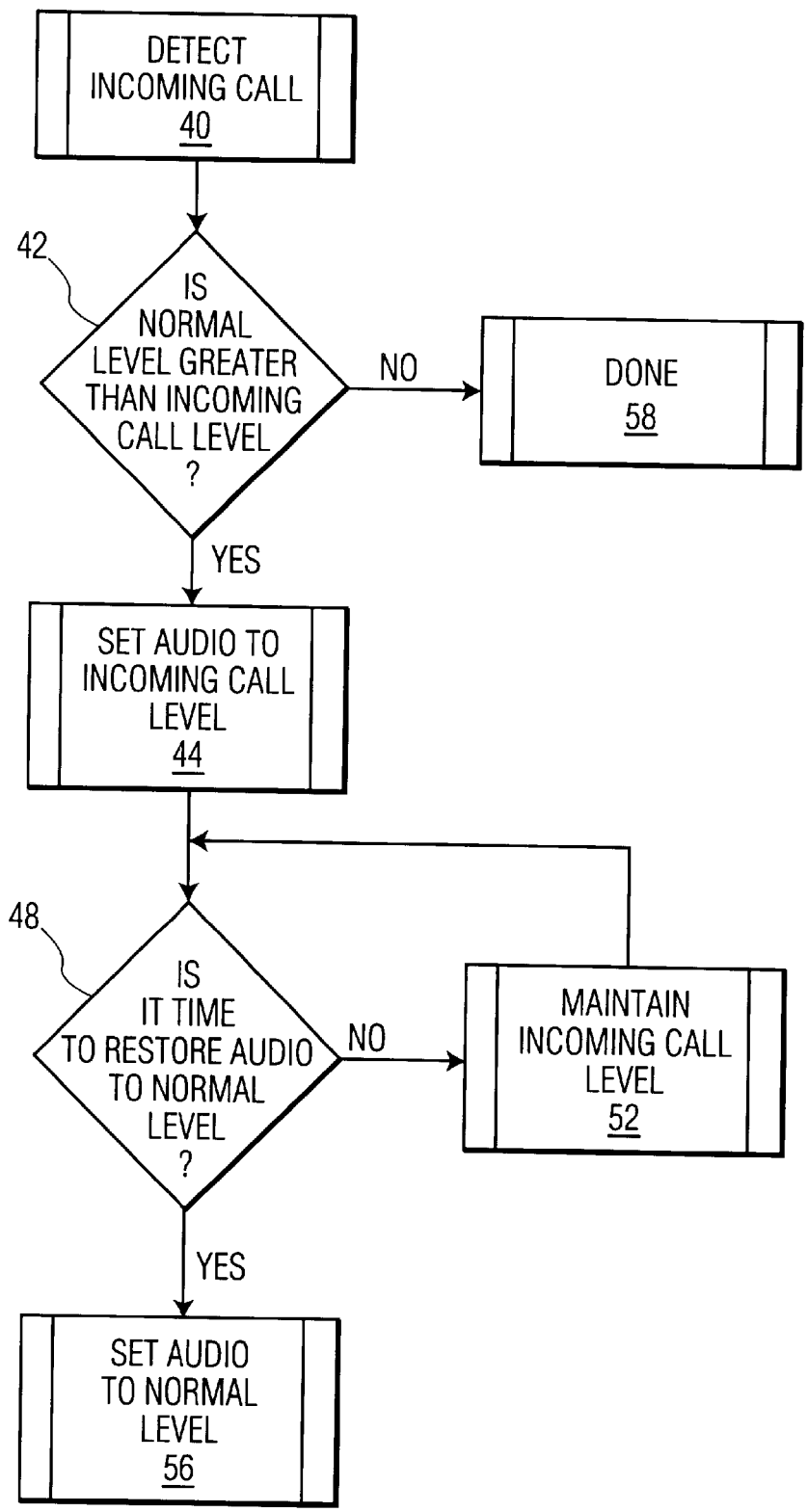
FIG. 5 is a process flow for a program to automatically adjust the output signal from an electronic device according to an alternate embodiment of the present invention.

In an enhanced algorithm, the system of the present invention can consider the current unaltered audio level in deciding the appropriate action. For example, suppose a user is currently listening to a television at a volume level of 15, and the INCOMING CALL LEVEL (FIG. 3, 204) is set to 19. In this case, the system show in FIG. 2 would increase the amplitude of the audio output signal to a numerical volume level of 19. It may not be desirable, however, to increase the volume of a television's audio output signal during a telephone call. One solution to this problem is to implement an algorithm that only makes volume adjustments if the current normal audio level is of greater level than that of the INCOMING CALL LEVEL (FIG. 3, 204) value. FIG. 5 shows a process flow incorporating an enhanced algorithm to adjust the audio output signal only if it is greater than the value set in the INCOMING CALL LEVEL register.

As shown in FIG. 5, an incoming call is detected (step 40). The next step 42 compares the current audio volume level to the value set for INCOMING CALL LEVEL volume (step 42). If the current audio volume level is not greater than the INCOMING CALL LEVEL volume value, then the process proceeds to step 58. The algorithm is then terminated without any adjustment to the volume level of the audio output signal (step 58). If the current audio volume level is greater than the INCOMING CALL LEVEL volume value, then the algorithm proceeds to step 44. Next, the volume level of the audio output signal is adjusted to the desired value for INCOMING CALL LEVEL (step 44).

If the audio output signal is adjusted (step 44), the algorithm proceeds to step 48 to evaluate whether the conditions exist for restoring the audio output signal to the volume level that was in use prior to the incoming call. This portion of the algorithm functions in the same way as described previously in reference to the same step numbers in FIG. 2.

External Control Device

Figure 6:
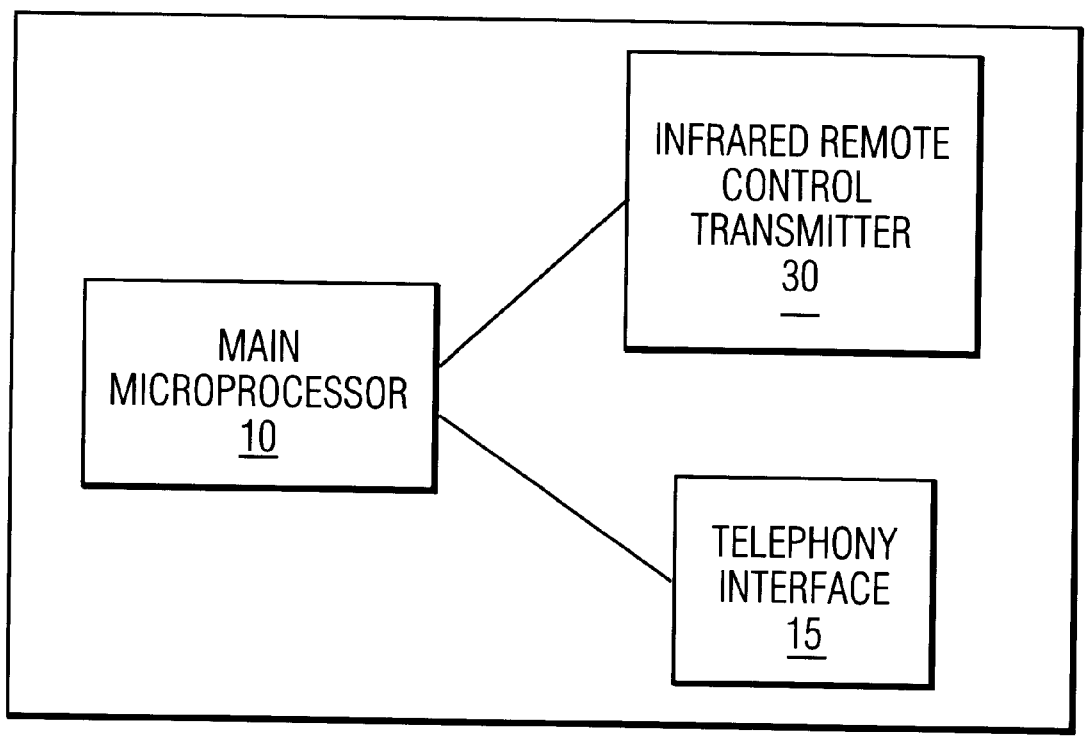
FIG. 6 is a block diagram of a control device according to one embodiment of the present invention.

In another aspect of the present invention shown in FIG. 6, an external control device is provided which may be connected to a power receptacle or receive operational power from an internal source such as a battery (not shown). The external device detects an incoming telephone call and adjusts the volume level of an electronic device, such as a television, by providing a control signal to remote control and front panel receiver (22 in FIG. 1). The external control device may comprise, for example, a telephony interface 15 which may be either hardwired to a telephony network or remotely connected to a telephony network as exemplified by a cellular network or a remote telephone device. The telephony interface of the external control device provides an incoming call status. The telephony interface 15 may be, for example, a modem or it may be a dedicated circuit that simply detects a ring signal on a telephone line. A processing unit 10 is coupled to the interface 15 and to a transmitter 30 to detect an incoming call status corresponding to an incoming call and to provide a control signal for transmission to the electronic device by the transmitter 30. The control signal is preferably programmed to replicate a volume adjustment signal from a remote control device used in conjunction with the particular electronic device. The control device may be programmed for a specific electronic device by entering a code corresponding to that electronic device. The control device can control multiple electronic devices by providing multiple control signals corresponding to the electronic devices.

The present invention provides a means for automatically adjusting the volume level of the audio output signal of a digital television or other electronic device during an incoming call. It also provides means for restoring the audio output signal to its previous volume level after the call is complete. This invention provides several advantages over existing systems. First, an electronic device user does not have to "fumble" for a remote or volume buttons to lower the volume of an electronic device when an incoming call takes place, because it is automatically done for them. Second, the user of an electronic device reduces the risk of "not hearing" a phone call due to current listening volume, because the volume can be automatically lowered when the call comes in. Third, an electronic device user can elect to manually control the volume restoration, or allow the system of the present invention to automatically restore the volume when the call is completed. Fourth, an electronic device user can have the option of receiving a visual indication that an incoming call has arrived on a video display of the electronic device being used. Fifth, an electronic device user does not need to subscribe to a telephone provider auxiliary service (for example: Caller ID) to take advantage of this invention, since this invention does not use any auxiliary information.

Although the exemplary system is described in terms of a hardware implementation, it is contemplated that some or all of the hardware functionality may be practiced in software running on a data processor of a remote control unit. This software may be embodied in a carrier such as magnetic or optical disk or a radio frequency or audio frequency carrier wave. The external control device embodiment of this invention may be implemented, for example, on a standard personal digital assistant having an infrared communications port and an interface to a PSTN or cellular telephone system to detect an incoming call.

It will be understood that various changes in the details, materials, and arrangements of the parts which have been described and illustrated above in order to explain the nature of this invention may be made by those skilled in the art without departing from the principle and scope of the invention as recited in the following claims.

What is claimed:

1. A method of automatically adjusting an active audio signal emanating from an electronic device, comprising the steps of:
   providing user preference settings;
   receiving an incoming call status;
   detecting when the incoming call status corresponds to an incoming call;
   adjusting the active audio signal to an attenuated volume level according to the user preference settings when the incoming call status corresponds to an incoming call;
   after adjusting the audio output signal volume level, determining whether conditions exist for restoring the active audio signal to an unadjusted volume level; and
   when conditions exist for restoring the active audio signal to an unadjusted volume level, restoring the active audio signal to an unadjusted volume level;
   wherein the conditions for restoring the active audio signal to an unadjusted volume level comprise a ring signal ending.

2. The method of claim 1 further comprising the steps of:
   setting an INCOMING CALL LEVEL using a user interface;
   after detecting an incoming call, determining if the current audio output signal volume level is greater than the INCOMING CALL LEVEL; and
   terminating the method for automatically adjusting the active audio signal emanating from an output of an electronic device if the current volume level is not greater than the INCOMING CALL LEVEL.

3. The method of claim 1 wherein the active audio signal is adjusted by providing a control signal corresponding to a volume adjustment signal from a remote control device.

4. The method of claim 1, wherein the adjusting step comprises the step of:
   adjusting the active audio signal by a relative reduction.

5. A machine readable electronic carrier, having encoded thereon program code, wherein, when the program code is executed by a machine, the machine implements a method for automatically adjusting an output signal of an electronic device in response to an incoming telephone call, the method comprising the steps of:
   providing user preference settings;
   receiving an incoming call status;
   detecting when the incoming call status corresponding to an incoming call;
   adjusting the output signal upon detection of an incoming call to comprise at least one of a video alert signal and an active audio signal with an attenuated volume level according to the user preference settings;
   after attenuating the active audio signal, determining whether conditions exist for restoring the active audio signal to an unattenuated condition; and when the conditions exist for restoring the active audio signal to an unattenuated condition, restoring the active audio signal to an unattenuated condition;

wherein the conditions for restoring the active audio signal to an unadjusted volume level comprise a ring signal ending.

6. A receiver configured to receive an input signal comprising at least an audio signal and provide an output signal comprising at least an audio signal, the receiver comprising:

a telelephony interface providing an incoming call status;

a control interface providing a user selected desired volume level for the output audio signal;

a processing unit configured to execute a program to detect an incoming call status corresponding to an incoming call and to provide an output signal comprising an audio signal with an amplitude corresponding to the desired volume level in the absence of an incoming call and corresponding to at least one of a video alert signal and an attenuated volume level upon detection of an incoming call, wherein the attenuated volume level is maintained to coincide with an audible ring signal of the incoming call only.

7. The receiver of claim 6, wherein the user selected desired volume level is a relative reduction of the audio output signal.

8. The receiver of claim 6 wherein the processing unit is further configured to compare the current volume level with a threshold volume level upon detection of an incoming call and set the attenuated volume level to the lesser of the current volume level and the threshold volume level.

9. The receiver of claim 8 wherein the threshold volume level is set using the control interface.

10. The receiver of claim 9 wherein the output signal can be set using the control interface to further comprise an optional video alert when an incoming call is detected.

* * * * *